US 6,637,674 B1

(12) United States Patent
Mistler

(10) Patent No.: US 6,637,674 B1
(45) Date of Patent: Oct. 28, 2003

(54) DEVICE FOR SUPPLYING PREFERABLY LIQUID OR GASEOUS FUELS TO A COMBUSTION CHAMBER

(75) Inventor: Hans J. Mistler, Ruppertsweiler (DE)

(73) Assignee: Mika Heiztechnik GmbH, Ruppertsweiler (DE)

( * ) Notice: Subject to any disclaimer, the term of this patent is extended or adjusted under 35 U.S.C. 154(b) by 0 days.

(21) Appl. No.: 10/130,065

(22) PCT Filed: Nov. 14, 2000

(86) PCT No.: PCT/EP00/11267

§ 371 (c)(1),
(2), (4) Date: May 9, 2002

(87) PCT Pub. No.: WO01/38713

PCT Pub. Date: May 31, 2001

(30) Foreign Application Priority Data

Nov. 27, 1999 (DE) .......................................... 199 57 055

(51) Int. Cl.⁷ .............................................. F02M 41/02
(52) U.S. Cl. ................................ 239/533.1; 239/533.2; 239/533.3; 239/288
(58) Field of Search .......................... 239/533.3, 533.1, 239/533.2, 288

(56) References Cited

U.S. PATENT DOCUMENTS

| 4,658,791 | A | * | 4/1987 | Absenger et al. ............. 123/446 |
| 4,674,688 | A | * | 6/1987 | Kanesaka ................. 239/533.8 |
| 4,721,253 | A | | 1/1988 | Noguchi et al. |
| 4,840,163 | A | * | 6/1989 | Alsobrooks et al. ........ 123/533 |
| 4,917,352 | A | * | 4/1990 | Hauet et al. ............ 251/129.19 |
| 5,114,123 | A | | 5/1992 | Pfyl |
| 5,402,944 | A | * | 4/1995 | Pape et al. ..................... 239/88 |
| 5,722,455 | A | | 3/1998 | Caminada |
| 6,027,030 | A | | 2/2000 | Buijsse |

FOREIGN PATENT DOCUMENTS

| DE | 42 34 450 | 4/1994 |
| DE | 43 04 068 | 8/1994 |
| DE | 43 26 892 | 2/1995 |
| DE | 297 16 633 | 12/1997 |
| DE | 198 21 504 | 11/1998 |
| DE | 198 01 725 | 7/1999 |
| EP | 0 412 460 | 2/1991 |
| EP | 0 453 801 | 10/1991 |
| EP | 0 731 315 | 9/1996 |
| FR | 1 104 313 | 11/1955 |

* cited by examiner

Primary Examiner—Gregory L. Huson
Assistant Examiner—Azadeh Kokabi
(74) Attorney, Agent, or Firm—McGlew and Tuttle, P.C.

(57) ABSTRACT

A device for supplying preferably liquid or gaseous fuels to a combustion chamber is provided. The device includes a nozzle body which contains a hollow chamber and can be connected to a fuel supply line. The outlet of the nozzle body can be closed using a sealing element which has at least one flow channel, preferably a sealing cone. An actuating element (22) is located in the hollow chamber (2) of the nozzle body (1). The actuating element (22) controls the sealing element (11) and can be displaced in a first direction by the fuel which is to be supplied, against the force of a counter-bearing (23) located in the hollow chamber (2). This results in the exposure of the outlet (18) of the nozzle body (1). The sealing element (11) can be displaced in a second direction opposed to the first direction by the counter-bearing (23), in order to close the outlet (18).

22 Claims, 1 Drawing Sheet

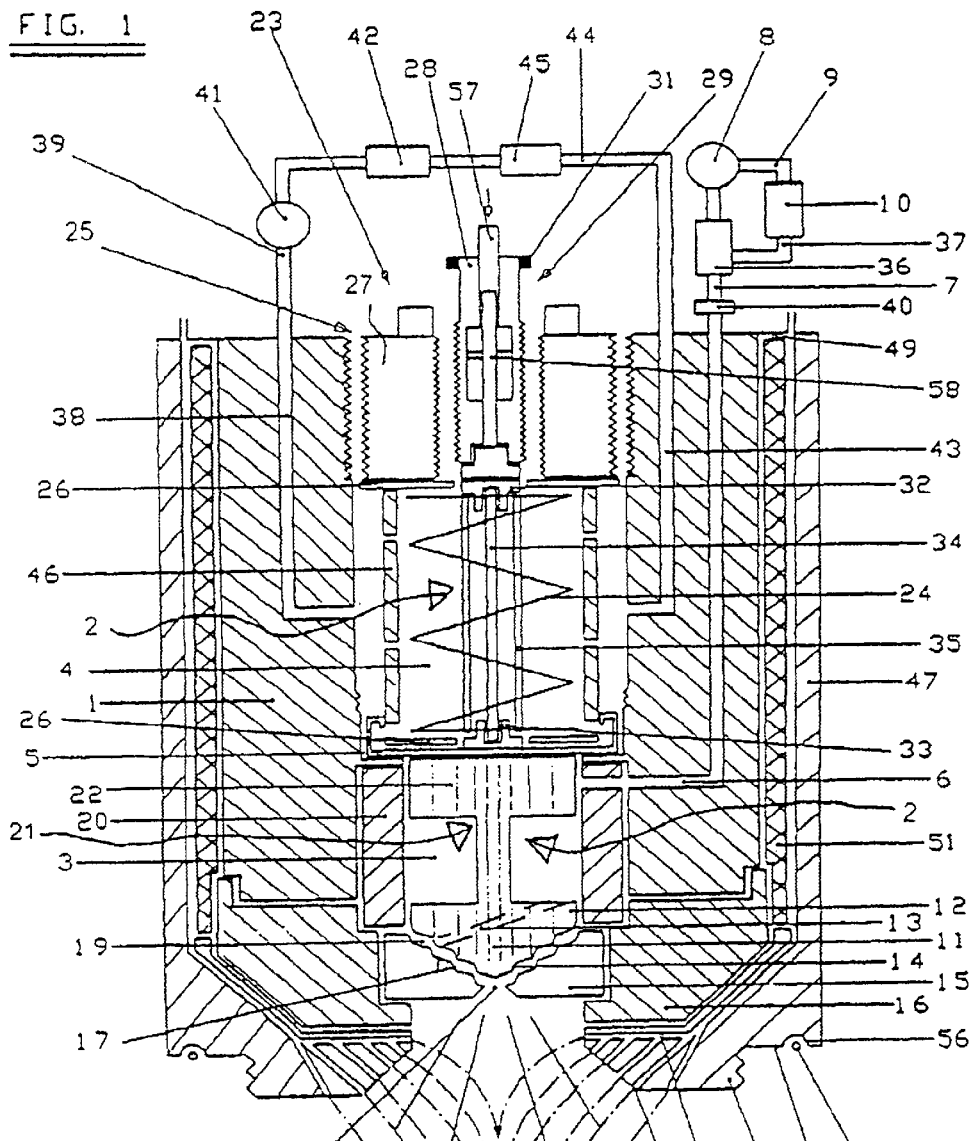
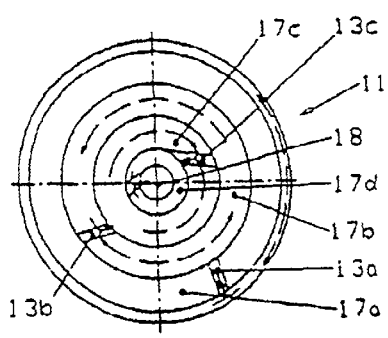
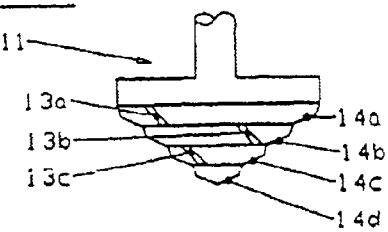

DEVICE FOR SUPPLYING PREFERABLY LIQUID OR GASEOUS FUELS TO A COMBUSTION CHAMBER

The present invention pertains to a device for feeding preferably liquid or gaseous fuels into a combustion chamber corresponding to the preamble of patent claim 1.

A device of this class for feeding liquid fuel, e.g., oil, into a combustion chamber is disclosed in DE 44 15 863.

An inset, which has a truncated cone-shaped design at its end located adjacent to the discharge orifice of the nozzle body, is arranged here within the nozzle body. The jacket surface of this truncated cone acts as a sealing surface, which cooperates with a truncated cone-shaped hole provided on the nozzle body, and the limiting surface of the said hole likewise acts as a sealing surface.

Flow channels, whose particular cross sections form the entire flow cross section for the fuel, are milled into the truncated cone-shaped jacket surface of the inset for the flow of the fuel. This flow cross section determines the amount of fuel reaching the discharge opening via a swirl chamber arranged in front of the discharge opening of the nozzle body. Since the total flow cross section for the fuel shall be kept relatively small, on the one hand, the velocity of the fuel flowing in shall be substantially increased and, on the other hand, a swirl shall be imposed on the fuel flowing in on its path from the inset to the swirl chamber or to the discharge opening due to the tangential arrangement of the flow channels relative to a base circle, as a result of which extremely fine atomization shall be achieved, which shall guarantee good combustion with high calorific output and a low percentage of pollutants.

Since the inset is held within the nozzle body by a pressure piece, an equal quantity of fuel always flows to the discharge opening regardless of the required output of the burner. This very easily leads to a supersaturation of the fuel mist and consequently to a reduction in the efficiency of the burner as well as to an increase in the percentage of pollutants. Since the feed of fuel cannot be stopped quickly enough when the burner is switched off, a plurality of drain holes leading to a central tank line are provided in the inset for excess fuel to prevent the dripping of the fuel.

Since the amount of fuel being discharged from the discharge opening of the nozzle body cannot be regulated, this device always operates with a continuous flow of an equal amount of fuel regardless of the required burner output. The device must therefore the removed and the inset must be replaced with another inset with a correspondingly adapted total cross section of the flow channels to adapt the amount of fuel to the required burner output. Even though it is described in this connection in DE 44 15 863 that the tank line can be closed by a valve and the amount of fuel flowing back can thus be fed to the burner, so that the burner can allegedly be used with two stages or even with an infinite regulation, this is disadvantageous insofar as it is no longer possible as a result to return excess fuel. On the one hand, the possibility of fuel dripping is substantially increased as a result and, on the other hand, the risk arises, especially when the reserve in the tank has been used up nearly completely, that the flow channels and/or the drain holes become clogged by contaminants present in the fuel or by fuel deposits, as a result of which an unacceptably high pressure may build up in the entire system.

The basic object of the present invention is to provide a device of this class which makes it possible to adapt the amount of fuel to be fed into the combustion chamber to the particular required output of the burner without any change in design. This shall also be possible during the operation of the burner.

This object is accomplished in a device of this class by arranging an actuating element for the sealing element in the cavity of the nozzle body, which said actuating element can be moved by the fuel to be fed in against the force of an end support arranged in the cavity in a first direction to release the discharge opening of the nozzle body and in a second direction opposite the first direction by the end support to close the discharge opening.

Due to the conversion according to the present invention of the pressure with which the fuel is led into the cavity into a force for the actuating element, the actuating element and, as a result, the end support are first moved in a first direction against the resistance of the end support. As a result, the sealing element is moved away from the discharge opening in the nozzle body, so that the fuel reaches the discharge opening of the nozzle body and from there the combustion chamber under the effect of the pressure still prevailing in the cavity. As a result, a pressure drop reducing the force for the actuating element is generated in the cavity despite the continued feed of fuel into the cavity, so that the force originating from the end support now predominates and the actuating member and consequently also the sealing element are returned opposite their first direction of movement into their starting position, in which the sealing element will again close the discharge opening of the nozzle body. Since this process occurs repeatedly as many times as desired, a pulsating fuel flow is generated in the combustion chamber, which can be dimensioned such that the fuel cone in the combustion chamber will not separate if the pressure in the fuel feed line and the force for the actuating element, which is derived herefrom, and the force of the end support are dimensioned correspondingly.

Both the fuel consumption and the amount of pollutants generated can thus be optimized in an especially simple manner. Since the discharge opening of the nozzle body is opened during a relatively short time interval only, during which the actuating force predominates over the force originating from the end support, dripping of the fuel is practically ruled out.

A solution that functions in a simple manner from a design viewpoint and quickly and does not require any transmission device is obtained by the actuating element being formed by a piston, to which the pressure of the fuel to be fed in can be admitted, and which is preferably made in one piece with the sealing element.

To generate the opposing force for the piston, the end support has a compression spring, which is supported against the piston at one end and against an abutment arranged in the nozzle body at the other end.

An advantageous embodiment of the abutment for the compression spring, which makes it possible to change the characteristic of the compression spring and consequently to adapt the force of the end support to different pressure conditions in the fuel feed line in a simple manner, is obtained if the abutment is formed by an adjusting screw, whose relative position in relation to the nozzle body can be set by a movement thread.

Limitation of the maximum size of the flow cross section for the fuel in the area of the discharge opening is made possible if the end support has an adjusting device having a stop (counterpiece) for limiting the path of movement of the piston.

A compact design of the abutment and the adjusting device is obtained if the latter is arranged coaxially to the abutment and has a controllable adjusting member for changing the distance between the piston and the stop (counterpiece).

To achieve the controllable movement of the adjusting member, an adjusting device which can be actuated pneumatically, hydraulically or mechanically may be associated with the adjusting member.

It is favorable in terms of the design to divide the cavity into two chambers, the actuating element and the sealing element closing the discharge opening being arranged within the first chamber, whereas the compression spring of the end support is arranged in the second chamber.

To make it possible to change the force for the actuating element under identical pressure conditions within the fuel feed line, the cross-sectional area of the first chamber can be changed by inserting bushings of different internal diameters.

The holes of the bushings may be designed as stepped holes, the particular area with the large diameter acting as a guide for the piston and the particular area with the smaller diameter compared with that diameter acting as a guide for a cylindrical attachment of the sealing element.

To make it possible to complement the force of the compression spring by an additional fore and thus to achieve an increased flexibility of adaptation of the force of the end support to different pressure conditions in the fuel feed line, the second chamber has an inlet for a feed channel to generate a back pressure to the pressure that can be built up in the first chamber by the fuel fed in.

To guarantee a pressure that does not exceed a presettable maximum pressure within the second chamber, the latter has a connection for a tank line having a pressure-limiting valve.

To achieve the most uniform pressure distribution possible within the second chamber, the inlet for the feed channel and the connection for the tank line are preferably arranged at points of the second chamber that are located diametrically opposite each other.

To achieve the most uniform possible application of the force of the piston, a bushing, which surrounds the compression spring and whose length can be changed telescopically, is arranged within the second chamber between the abutment and the diaphragm. The bushing is advantageously provided with cross holes for the passage of the pressurized medium.

To make it possible to easily replace the sealing surfaces provided on the nozzle body and also to machine or even to retouch them without difficulties, these sealing surfaces are provided on replaceable insets, which are accommodated by a carrying part detachably connected to the nozzle body.

To feed air into the combustion chamber, the nozzle body and the carrying part have essentially the same external diameter, and the nozzle body or the carrying part is detachably connected to an outer part, which is designed as a hollow body and is provided with at least one air feed channel.

If the air feed channel is directed essentially in parallel to the longitudinal axis of the outer part and is open toward the hole of the outer part, it is advantageous for the internal diameter of the outer part to be larger than the external diameter of the nozzle body or of the carrying part, so that the cross section of the air feed channel can be changed by inserting compensating bushings of different external diameters.

Favorable feed of the combustion air as well as good mixing of the combustion air with the fuel can be achieved if the shape of the air feed channel is adapted to the outer contour of the carrying part in the area of its end located adjacent to the carrying part and its free end is expanded in a funnel-shaped manner.

To prevent the pressure within the fuel feed line or within the first chamber from rising above a selectable maximum value, the fuel feed line has, preferably in the immediate area of the nozzle body, a pressure-limiting valve, which connects the fuel feed line to a tank line above a maximum allowable pressure.

To always guarantee a minimum pressure for the actuating element within the first chamber, the fuel feed line has a pressure-regulating valve, which is preferably arranged in the immediate area of the nozzle body and blocks the flow to the first chamber below a settable minimum pressure. As a result, the function of the actuating element according to the present invention is ensured, on the one hand, and, on the other hand, fuel is prevented from dripping into the combustion chamber through the discharge opening when the pressure within the first chamber is too low.

It is advantageous for at least part of the wall of the cavity and an area of the piston to consist of magnets or antimagnetic metals, which support or initiate the pulsating opening and closing of the discharge opening by current pulses.

To additionally set the piston into rotary motion during its working movement, the piston has means to derive a rotary movement from the pressure energy of the fuel.

To make it possible to meter even very small quantities of fuel reliably and accurately, the sealing surface of the sealing element is divided into a plurality of sealing surface sections, which are arranged in a stepped manner and cooperate with sealing surface sections of the sealing surface of the inset, which are arranged in a correspondingly stepped manner.

To achieve an especially intense mixing of the fuel with the air to be fed in, at least some of the discharge slots of the air feed channel are arranged and directed such that the air flow discharged from the air feed channel meets the fuel mist being discharged from the discharge opening in the area of the discharge opening.

Further details and advantages of the present invention will appear from the following description of an exemplary embodiment of the present invention which is shown in the drawings.

In the drawings,

| FIG. 1 | shows a longitudinal section of the device; |
|---|---|
| FIG. 2 | shows an enlarged top view of the sealing element; |
| FIG. 3 | shows an enlarged front view of the sealing element. |

In FIG. 1 of the drawings, a nozzle body, which has a cavity, which extends in its longitudinal direction and is divided into two chambers 3 and 4, is designated by reference number 1. A diaphragm 5, which may be made, e.g., of rubber, is used to divide the cavity 2 into the two chambers 3, 4. A feed channel 6 for a fuel, one end of which opens into the chamber 3 and the other end of which is connected to a feed line 7, is milled into the nozzle body 1. The feed line 7 is supplied by a pump 8, which is connected to a fuel tank 10 via a line 9. The pump 8 delivers the fuel into the chamber 3 with a preselectable pressure.

A sealing element 11, which has the shape of a cone or a truncated cone with a cylindrical attachment 12, is arranged in the area of the chamber 3 which is the lower area in the drawing. A flow channel 13 for the fuel, which is directed obliquely, radially or even tangentially to the longitudinal axis of the cone, is milled into the jacket surface of the cone. A plurality of flow channels 13, which are to be arranged corresponding to the desired direction of discharge of the fuel from the particular flow channel 13, may, of course, also be milled into the cone. A swirl can be imposed on the fuel by selecting the direction of the flow channels 13 correspondingly. Through the flow channel 13, the fuel reaches the underside of the sealing element 11, which acts as a sealing surface 14. The sealing element 11 or its sealing surface 14 cooperates with an inset 15, which is held by a carrying part 16, which is screwed onto the nozzle body 1 by a thread in a liquid- and gas-tight manner.

In a preferred embodiment of the present invention, a thrust bearing may be arranged between the inset 15 and the sealing element 11, so that the sealing element 11 can rotate around its longitudinal axis relatively easily despite the pressure acting on it. The arrangement of such a thrust bearing is especially advantageous when the piston 21 made in one piece with the sealing element 11 or the sealing element 11 is equipped with blade wheel-like or turbine-like device, so that the piston 21 can be set into rotation together with the sealing element 11 by the fuel being discharged from the feed channel 6. The swirl of the fuel to be fed in and atomized increases as a result without a separate drive device being required for this.

The nozzle body 1 and the carrying part 16 preferably have the same external diameter. The inset 15 is provided with a conical hole, whose limiting surface acts as a sealing surface 17 and cooperates with the sealing surface 14.

In a preferred embodiment of the present invention, the sealing element may be designed as a multistep cone, which may be formed by a plurality of steps arranged directly one on top of another. In the exemplary embodiment shown, the sealing element 11 has a total of 4 steps, whose respective jacket surfaces form the sealing element sections 14a, 14b, 14c and 14d. These steps may be provided with a flow channel 13a, 13b, 13c and 13d each, and the latter may be preferably arranged offset by 120° each in relation to one another (FIGS. 2 and 3). The flow channels 13a, 13b, 13c and 13d may be preferably designed as grooves open toward the respective sealing surface 14a, 14b, 14c and 14d, so that the size of their cross section can be easily adapted to different amounts of fuel. Due to the flow channels 13a, 13b, 13c and 13d being designed as open grooves, their cross section can be minimized to fine grooves, on the one hand, and, on the other hand, the risk of clogging of the flow channels 13a, 13b, 13d and 13d having only a minimal cross section is ruled out due to the open design.

Corresponding to the step-like design of the sealing element 11, the hole provided in the inset 15 likewise has a stepped design, so that the sealing surface 17 is composed of the individual sealing surface sections 17a, 17b, 17c and 17d, which cooperate with the corresponding sealing surface sections 14a, 14b, 14c and 14d of the sealing element 14. The fuel thus passes through the flow channels 13a, 13b, 13c and 13d one after another, and the flow cross section 19 can be sealed in the individual steps one after another. As a result, accurate metering of the amount of fuel can be achieved, on the one hand, and, on the other hand, particles present in the fuel can be crushed by the repeated pressing of the fuel. Even though a very high pressure can be applied to the fuel on its way from the chamber 3 to its discharge from the nozzle body 1, the radial load on the sealing element 11 remains relatively low.

The nozzle body 1 has a discharge opening 18 for the fuel, which is provided at the inset 15. The sealing surfaces 14, 17 are microfinished and are pressed against each other with the discharge opening 18 closed. With the discharge opening 18 opened, the sealing surfaces 14, 17 are located at mutually spaced locations from one another, the distance between them determining the size of a flow cross section 19.

The sealing element 11 is made in one piece with a piston 21 and acts as an actuating element 22 for the latter. The piston 21 is guided within the chamber 3 in the vertical direction by the bushing 20 inserted into the chamber. To make it possible to change the force for the actuating element under identical pressure conditions within the fuel feed line 7, the cross-sectional area of the chamber 3 can be changed by inserting bushings 20 of different internal diameters. The holes of the bushings 20 may be designed as stepped holes, the particular area with the large diameter acting as a guide for the piston 21 and the particular area with the smaller diameter compared with the former diameter acting as a guide for the cylindrical attachment 12 of the sealing element 11.

The piston 21, to which the pressure of the fuel to be fed in can be admitted on its underside, acts via the diaphragm 5 on an end support 23, which has a compression spring 24 arranged within the chamber 4. This [spring] is supported at one end against the piston 21 or the diaphragm 5 and at the other end against the abutment 25, which is accommodated in the nozzle body 1, via the intermediary of an upper pressure plate 26. The abutment 25 is formed by an adjusting screw 27, whose relative position in relation to the nozzle body 1 can be set by a pressure-sealed movement thread. By changing the relative position between the nozzle body 1 and the adjusting screw 27, the force of the compression spring 24 and consequently its characteristic can be changed. The force of the compression spring 24 can thus be adapted to different pressure conditions of the fuel to be fed in.

An adjusting member 28 of an adjusting device 29, whose relative position in relation to the abutment 25 and consequently also to the nozzle body 1 can be changed by a likewise pressure-sealed movement thread, is accommodated in the abutment 25. The change in the relative position between the abutment 25 and the adjusting member 28 can be brought about manually or by an adjusting device 31 (indicated only symbolically in the drawing), which acts on the adjusting member 28 and is actuated by a motor, pneumatically or hydraulically.

A pressure piece 32, which is used to receive a bolt 34 together with a counterpiece 33, is in contact with the underside of the adjusting member 28. The bolt 34 is surrounded by a sleeve 35, which is likewise arranged within the compression spring 24 and is likewise arranged between the pressure piece 32 and the counterpiece 33. The relative position between the counterpiece 33 forming a stop for the piston 21 and the piston 21 can thus be changed by rotating the adjusting member 28 without changing the characteristic of the compression spring 24. Due to the limitation of the stroke of the piston 21, the maximum distance between the sealing surfaces 14 and 17 and consequently the maximum size of the flow cross section 19 for the fuel is limited. Not only can the maximum size of the flow cross section 19 be set by adjusting the adjusting member 28 and consequently the relative position of the pressure piece 32 as well as of the counterpiece 33, but any desired size of the flow cross section 19 can be set by the closely stepped adjustment of the adjusting member 28. The amount of fuel to be fed into the combustion chamber can thus be adapted to the required output of the burner, and the flow rate of the fuel can be controlled downward to practically any selectable minimum amount per hour.

The fuel flowing under a defined pressure from the feed channel 6 into the chamber 3 of the cavity 2 is converted by the piston 21 (actuating element 22) into a force directed toward the end support 23 with the discharge opening 18 closed. As a result, the end support moves first in a first direction, i.e., upward in the drawing, against the force of the compression spring 24 being tensioned together with the piston 21. As, a result, the sealing element 11 is moved away from the discharge opening 18 of the nozzle body, so that the fuel reaches the opening flow cross section 19 and the discharge opening 18 through the flow channel 13 under the action of the pressure still prevailing in the chamber 3 and it then enters the combustion chamber from the said discharge opening. As a result, a pressure drop reducing the force for the actuating element 22 is generated in the chamber 3 despite the continued feed of fuel into the chamber 3, so that the force originating from the relaxing compression spring 24 of the end support 23 predominates over the force of the actuating element 22 (piston 21) and the actuating element 22 (piston 21) and consequently also the sealing element 11 are returned into their starting positions against their first direction of movement, in which the respective sealing surfaces 14 and 17 of the sealing element 11 and of the inset are pressed against each other by the force of the compression spring 24. Thus, no more fuel can reach the discharge opening 18.

Due to this process, which is repeated as many times as desired, a pulsating fuel flow is generated in the combustion chamber, which can be dimensioned such that the fuel cone will not separate in the combustion chamber if the pressure in the feed channel 6 as well as the force derived herefrom for the actuating element 22 and the force of the compression spring 24 of the end support 23 are dimensioned correspondingly.

Since the pressure drops rapidly in the feed channel 6 when the burner is switched off, the flow cross section 19 is closed correspondingly rapidly by the compression spring 24, so that dripping of fuel can be prevented from occurring.

To ensure that the pressure of the fuel does not exceed a maximum either within the chamber 3 or within the feed channel 6, a pressure-limiting valve 36, which opens the feed line 7 to a tank line 37 leading to the fuel tank 10 above the maximum of the pressure, is provided, preferably in the immediate area of the nozzle body 1. To ensure at the same time hat the fuel is always fed into the chamber 3 under a minimum pressure, a pressure-regulating valve 40, which opens only above the preselectable minimum pressure, may be arranged within the feed line 7, so that the fuel is always fed to the chamber 3 under a pressure that corresponds to the minimum pressure. It is advantageous for the pressure-regulating valve 40 to be arranged in the area in which the feed line 7 is connected to the nozzle body 1.

It is, of course, possible to integrate the function of the pressure-limiting valve 36 and that of the pressure-regulating valve 8, which is provided with a plurality of outlets in this case, and its first outlet is to be connected in this case to the feed channel 6 and a second outlet is to be connected to the tank line 9 or to the fuel tank 10, so that the tank line 37 may be eliminated.

Furthermore, if the fuel also acts as a pressurized medium for the chamber 4, it is possible to connect the fuel line 7 and the delivery line 39 to one another, so that the fuel line 7 and the delivery line can be supplied by one pump.

To support the force of the compression spring 24, the chamber 4 has a feed channel 38 for a pressurized medium, which is connected via a feed line 39 to a pump 41, which is in turn connected to the tank 42. A drain channel 43 for the pressurized medium, which is connected to the tank 42 via a line 44 with a pressure-limiting valve 45, is provided in the nozzle body 1 on the side of the chamber 4 located diametrically opposite the orifice of the feed channel 38. The pressure-limiting valve 45 opens when the pressure within the chamber 4 exceeds a permissible maximum due to the movement of the actuating element 22 (piston 21).

A bushing 46, which surrounds the compression spring 24, has a telescopic design and is provided with cross holes, not designated specifically by a reference number, is arranged within the chamber 4 for the passage of the fuel. The bushing 46 is supported with its lower end against the diaphragm 5 or a lower pressure plate 26 lying on same and with its upper end against the upper pressure plate 26. With pressurized medium admitted into the chamber 4, the actuating element first operates both against the force of the compression spring 24 and against the resistance arising from the admission of pressure into the chamber 4. As soon as an equilibrium is reached between the pressurized medium and the compression spring 24, on the one hand, and the force derived from the pressure of the fuel, on the other hand, the direction of movement of the actuating element 22 (piston 21) reverses. The movement of the actuating element 22 (piston 21) is now accelerated by both the relaxing compression spring 24 and the pressure drop within the chamber 4. The discharge of the fuel, to which swirl has been imposed, from the discharge opening is thus also accelerated, so that it enters the combustion chamber in a swirled form under high pressure as a fuel mist. The acceleration imparted on the actuating element 22 (piston 21) brings about at the same time the rapid closing of the flow cross section 19, as a result of which dripping of fuel into the combustion chamber is ruled out.

Even though a pulsating fuel flow or a pulsating flow of fuel mist is obtained even based on the mode of action according to the present invention alone, this pulsation can also—or additionally—be controlled. Switches similar to solenoid valves with magnets or antimagnetic metals, which are energized for opening, closing or cycling, can be inserted for this purpose in the feed line 39 or in the line 44 as well as in line 7.

If air is to be mixed with the fuel flowing into the combustion chamber, an outer sleeve 47 may be screwed on the nozzle body 1 or the carrying part 16. For feeding air, this sleeve may be provided with an air feed channel 48 extending in its longitudinal direction, which is open toward the inner hole 49 of the outer sleeve 47. The diameter of the inner hole 49 is larger in this case by a certain amount than the external diameter of the nozzle body 1 or of the carrying part 16, and the intermediate space formed hereby may be filled by replaceable bushings 51, which in turn have different external diameters. The air feed channel 48 can be varied as a result and adapted to the particular air requirement.

In the area of the carrying part 16, the shape of the air feed channel 48 is adapted to the outer shape of the carrying part 16 and it first tapers to expand again in a funnel-shaped manner. In the area of its free end, the air feed channel 48 is provided with a plurality of discharge slots 52, which are directed such that the air being discharged from them intersects the fuel cone being discharged from the discharge opening 18 and is mixed with same. At least some of the discharge slots 52, preferably the discharge slots 52 ending in the immediate area of the discharge opening 18, may be directed such that they meet the fuel cone being formed in the immediate area of the discharge opening 18. Due to the arrangement of the air feed channel 48, the fuel cone being discharged from the discharge opening 18 can be enriched with air or oxygen in practically any desired ratio.

To make it possible to screw the outer sleeve 47 together with the nozzle body 1 into a combustion chamber, the said outer sleeve is provided with an attachment 53 having a thread, and it has a groove 56 for receiving an O ring 55 on its front surface.

What is claimed is:

1. A device for feeding liquid or gaseous fuels into a combustion chamber, comprising:
   a nozzle body for connection to a fuel feed line, the nozzle body having a cavity with a discharge opening;
   a sealing element for closing the nozzle body;
   a piston for moving the sealing element, pressure of the fuel being fed being admitted to the piston;
   a spring acting on the piston;
   an end support arranged in said cavity acting in a first direction to release said discharge opening and in a second direction opposite the first direction, by at least partially relaxing said spring, to close said discharge opening, said end support having an abutment for said spring with a relative position in relation to said nozzle body that can be set to change the pretension of said spring by an adjusting screw setting device.

2. A device in accordance with claim 1, wherein said end support has an adjusting device with a counterpiece stop for limiting the path of movement of said piston.

3. A device in accordance with claim 2, wherein said adjusting device is arranged coaxially to said abutment and has an adjusting member for changing the distance between said piston and said counterpiece stop.

4. A device in accordance with claim 3, wherein said adjusting member can be actuated pneumatically, hydraulically or by a motor by a controllable adjusting device.

5. A device in accordance with claim 1, wherein said cavity is divided by a separating insert into two chambers, wherein the cross-sectional area of a first chamber accommodating said piston can be changed by inserting bushings of different internal diameters.

6. A device in accordance with claim 5, wherein said bushings cooperate to provide stepped internal diameters with an area with a large diameter acting as a guide for said piston and with an area with a smaller diameter compared with the larger diameter acting as a guide for a cylindrical attachment of said sealing element.

7. A device in accordance with claim 5, wherein said second chamber has an inlet for a feed channel for generating a back pressure to the pressure that can be built up in said first chamber by the fuel being fed in.

8. A device in accordance with claim 5, wherein said second chamber has a connection for a tank line having a pressure-limiting valve.

9. A device in accordance with claim 5, wherein an inlet for a feed channel of the second chamber and a connection for a tank line are arranged at points of said second chamber located diametrically opposite each other.

10. A device in accordance with claim 5, wherein a bushing surrounds said compression spring and has a length that can be changed telescopically, said bushing being arranged within said second chamber between an abutment and a diaphragm.

11. A device in accordance with claim 10, wherein said bushing has cross holes for the passage of the pressurized medium.

12. A device in accordance with claim 1, wherein said nozzle body and a carrying part have essentially the same external diameter and said nozzle body or said carrying part is detachably connected to an outer part including a hollow body and has at least one air feed channel.

13. A device in accordance with claim 12, wherein said air feed channel is directed essentially in parallel to a longitudinal axis of said outer part and is open toward the hole of said outer part.

14. A device in accordance with claim 1, further comprising:
   a compensating bushing;
   a carrying part and
   an outer part with an internal diameter larger than an external diameter of said nozzle body, said nozzle body cooperating with said carrying part, said carrying part being provided surrounding said discharge opening, said outer part having an internal diameter larger than said an external diameter of said carrying part, an air feed channel being formed between said outer part and said nozzle body and between said outer part and said carrying part with a cross section of an air feed channel be changed by inserting a compensating bushing of one of various different external diameters between said outer part and said nozzle body and between said outer part and said carrying part.

15. A device in accordance with claim 5, wherein the shape of said air feed channel is adapted in the area of its end located adjacent to said carrying part to an outer contour of said carrying part and its free end is expanded in a funnel-shaped manner.

16. A device in accordance with claim 1, wherein in an immediate area of said nozzle body, said fuel feed line has a pressure-limiting valve, which connects said fuel feed line to a tank line above a maximum allowable pressure.

17. A device in accordance with claim 1, wherein said fuel feed line has a pressure-regulating valve, which is preferably arranged in an immediate area of said nozzle body and blocks the flow to said chamber below a settable minimum pressure.

18. A device in accordance with claim 1, wherein the fuel line and a delivery line are supplied by a common pump.

19. A device in accordance with claim 1, wherein at least part of a wall of said cavity and an area of said piston consist of magnets or antimagnetic metals, which support or initiate the pulsating opening and closing of said discharge opening by current pulses.

20. A device in accordance with claim 1, wherein said piston has means to derive a rotary movement of said piston from the pressure energy of the fuel.

21. A device in accordance with claim 1, wherein a sealing surface of said sealing element is divided into a plurality of sealing surface sections arranged in a stepped manner, which cooperate with sealing surface sections of a sealing surface of an inset, which are arranged in a correspondingly stepped manner.

22. A device in accordance with claim 1, wherein at least some of discharge slots of an air feed channel are arranged and directed such that the air flow being discharged from said channel meets the fuel mist being discharged from said discharge opening in the area of said discharge opening.

* * * * *